United States Patent
Jeong

(10) Patent No.: US 6,354,550 B2
(45) Date of Patent: Mar. 12, 2002

(54) METHOD FOR CONTROLLING SCREEN DIRECTION OF A VIDEO DISPLAY STAND

(75) Inventor: Seog Yeong Jeong, Kumi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/770,447

(22) Filed: Jan. 29, 2001

Related U.S. Application Data

(62) Division of application No. 09/397,138, filed on Sep. 16, 1999.

(30) Foreign Application Priority Data

Dec. 8, 1998 (KR) .............................................. 98-53753

(51) Int. Cl.$^7$ .............................. A47B 91/00; G05B 1/06
(52) U.S. Cl. .............................. 248/299.1; 248/346.01; 248/349.1; 248/422; 74/827; 348/827; 318/640
(58) Field of Search .............................. 248/183.3, 422, 248/186.2, 349.1, 346.06, 425, 131, 920, 371, 346.01, 299.1, 324; 74/827; 348/827; 318/640

(56) References Cited

U.S. PATENT DOCUMENTS

| | | | | |
|---|---|---|---|---|
| 3,813,491 A | * | 5/1974 | Pennar ........................ 348/827 |
| 4,368,867 A | * | 1/1983 | Pendleton et al. ..... 248/346.06 |
| 4,542,872 A | * | 9/1985 | Marino et al. ........... 248/183.3 |
| 4,547,027 A | * | 10/1985 | Scheibenreif ................ 439/13 |
| 4,555,990 A | * | 12/1985 | Egawa ........................ 108/20 |
| 4,579,473 A | * | 4/1986 | Brugger ...................... 403/163 |
| 4,640,485 A | * | 2/1987 | Day et al. .................... 248/422 |
| 4,697,778 A | * | 10/1987 | Harashima ................ 248/349.1 |
| 4,796,842 A | * | 1/1989 | Hamada et al. ........... 248/186.2 |
| 4,802,706 A | * | 2/1989 | Onimaru et al. .............. 296/68 |
| 4,905,543 A | * | 3/1990 | Choi ............................ 74/827 |
| 4,959,645 A | * | 9/1990 | Balz ........................... 340/825 |
| 4,964,606 A | * | 10/1990 | Beam et al. ................. 248/333 |
| 5,139,223 A | * | 8/1992 | Sedighzadeh ............... 248/324 |
| 5,243,434 A | * | 9/1993 | Nodama .................... 348/827 |
| 5,250,888 A | * | 10/1993 | Yu .............................. 318/640 |
| 5,263,678 A | * | 11/1993 | Birkbeck .................... 248/657 |
| 5,749,556 A | * | 5/1998 | Matsuoka et al. ....... 248/349.1 |
| 6,102,355 A | * | 8/2000 | Rood ........................ 248/425 |
| 6,231,020 B1 | * | 5/2001 | Willson .................... 248/349.1 |

* cited by examiner

*Primary Examiner*—Anita King
(74) *Attorney, Agent, or Firm*—Birch, Stewart, Kolasch & Birch, LLP

(57) ABSTRACT

A video display stand having dual panning axes suitable for controlling a screen direction of appliances such as a TV set or a personal computer without bumping against a wall even in a state that it is positioned very closely to the wall, and its controlling method for automatically controlling screen directions by using a driving force, including two motors being installed having gear driving shafts at one side of either a rotational base or a rotation support member of the TV set; two movement guide toothed slots each being formed along a circular arc centering a mutually opposite gear driving shaft with a predetermined width and depth, at the opposite side corresponding to the position of each motor, and having a gear portion to be engaged with the gear driving shaft at one side of each wall; and a controller for controlling driving of the motors.

8 Claims, 14 Drawing Sheets

METHOD FOR CONTROLLING SCREEN DIRECTION OF A VIDEO DISPLAY STAND

This application is a Div of Ser. No. 09/397,138 filed Sep. 16, 1999.

BACKGROUND OF THE INVENTION

1. Field of the Invention

The present invention relates to a video display stand, and more particularly to a video display stand having dual panning axes which is suitable for controlling a screen direction of appliances such as a TV set or a personal computer without bumping against a wall even in a state that it is positioned very closely to the wall, and its controlling method for automatically controlling screen directions by using a driving force.

2. Description of the Conventional Art

Generally, regarding a TV stand, for example, its screen direction is frequently desired to be changed according to viewing positions of a viewer.

Accordingly, if the TV stand would not be rotatable, the viewer should move the TV set whole to change its screen direction to desired positions for viewing, causing much inconvenience.

In an attempt to settle such inconvenience, a rotatable TV stand has been proposed.

FIG. 1 is a perspective view of a conventional TV set. As shown in the drawing, the TV set main body 1 is combined with a rotational support 2 which rotatably supports the TV from the bottom, so that the TV set can be rotated on the rotational support 2.

Such a general rotating apparatus has a single support, details of which will now be described with reference to FIGS. 2 and 3.

FIG. 2 is a plan view of the rotational support rotatably supporting the conventional TV set having a single support, and FIG. 3 is a sectional view showing a rotating support structure of the conventional TV set having the single support.

In the conventional TV set, as described above, a circular groove 3 is formed at a central portion of the rotational support 2. A combination hole 4 is formed at the center of the groove 3, and a circular rotation guide hole 5 having a constant radius centering the groove 3 is formed.

Corresponding to the rotational support 2, at a lower surface of the TV set main body 1, a rotational shaft 7 having a thread groove (not shown) is protrusively formed to be inserted into the groove 3 of the rotational support 2 and to be rotatably combined by being threaded with a screw 6 from the lower portion of the combination hole 4. A circular slide rib 8 is protrusively formed having a predetermined radius from the rotational shaft 7 and being inserted to the rotation guide groove 5 of the rotational support 2 so as to be slidably rotated centering the rotational shaft 7.

The TV set having such construction is rotatable 360° centering the rotational shaft 7, of which the slide rib 8 is slidably rotated along the rotation guide groove 5 when the screen direction of the TV set is desired to be changed by the viewer.

In this respect, as shown in FIG. 4, in most cases, the TV set is positioned near the wall.

Thus, when the TV set is rotated to change its screen direction, since the right and left edges 9a and 9b of the rear portion of the receiver main body 1 touch the wall, its rotation range is much limited.

In addition, when the TV set is inadvertently turned while being laid near the wall, as shown in a dotted line of FIG. 4, the edges 9a and 9b of the rear portion 9 of the TV set main body 1 are readily bumped against the wall 10, possibly causing a breakdown to the main body or a damage to its internal components due to the impact.

Meanwhile, in view of rotating the TV set in desired directions as well as preventing such a damage to the main body, the TV set needs to be enough distanced from wall, which, however, would occupy much space, resulting in a problem of efficiency in space utilization.

SUMMARY OF THE INVENTION

Accordingly, an object of the present invention is to provide a video display stand having dual panning axes which can be suitably adopted for controlling screen directions of a TV set, or a personal computer as required to be changed at its own position, without bumping against a wall even when they are placed closely near the wall, and its controlling method for automatically controlling screen directions by using a driving force.

To achieve these and other advantages and in accordance with the purpose of the present invention, as embodied and broadly described herein, there is provided a video display stand having dual panning axes having a rotational base incorporatively or separatively formed at a lower surface of the video display stand and a rotation support member for supporting the rotational base, including: two motors being installed at a predetermined space, having a gear driving shaft at one side of either the rotational base or the rotation support member, each being driven to be rotated in a normal direction and in a reverse direction; two movement guide toothed slots each being formed along a circular arc centering a mutually opposite gear driving shaft with a predetermined width and depth at the opposite side corresponding to the position of each motor, and having a gear portion to be engaged with the gear driving shaft at one side of each wall; and a controller for controlling the driving of the motor.

There is also provided a method for controlling screen directions of a TV set for which two motors are selectively driven in a normal direction (clockwise) and in a reverse direction in accordance with a key operation by a user so that the TV set can be rotated rightward or leftward centering the driving shaft of each motor, including the steps of: judging whether the key input by the user is right turn command or left turn command, and a current screen direction of the TV set; driving a motor positioned at the opposite side to the key input command, of the two motors, in the normal direction or in the reverse rotation direction until the key input is released in case that the current TV set is directed to the front side or is placed in the same direction as the judged turn command; rotating a motor positioned at the side corresponding to the key input command, of the two motors, in the normal direction or in the reverse direction until the key input is released, in case that the TV set is placed in a different direction to the judged turn command; and stopping the rotation of the motor positioned at the side corresponding to the key input and then rotating the other motor in the same rotation direction as that of the corresponding motor until the key input is released, in case that the key input has not released yet even when the current TV set is already directed to the front side.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
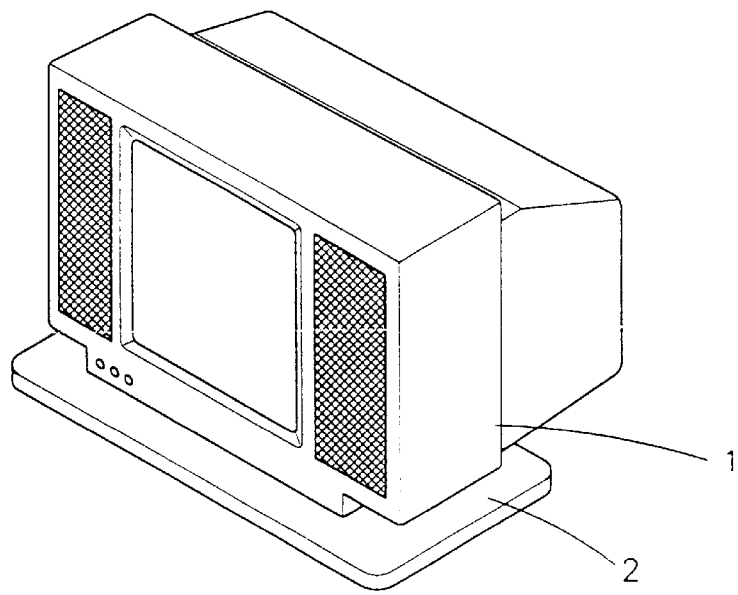
FIG. 1 is a perspective view of a conventional Video display stand.
Figure 2:
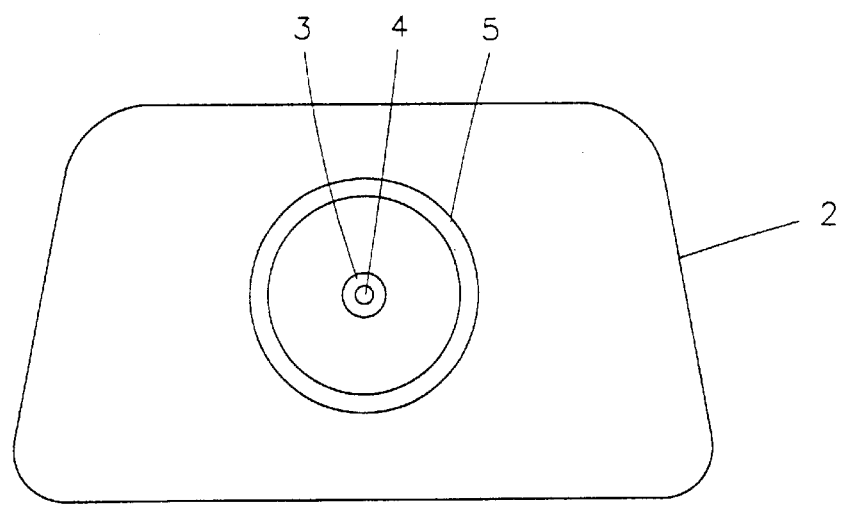
FIG. 2 is a plan view of a rotational support supporting the conventional Video display stand.
Figure 3:
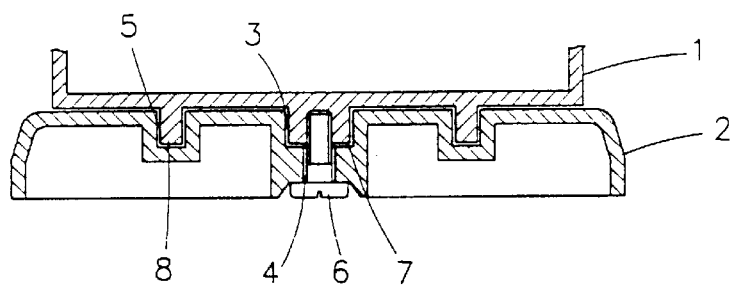
FIG. 3 is a sectional view showing a structure of the rotational support of the conventional Video display stand.
Figure 4:
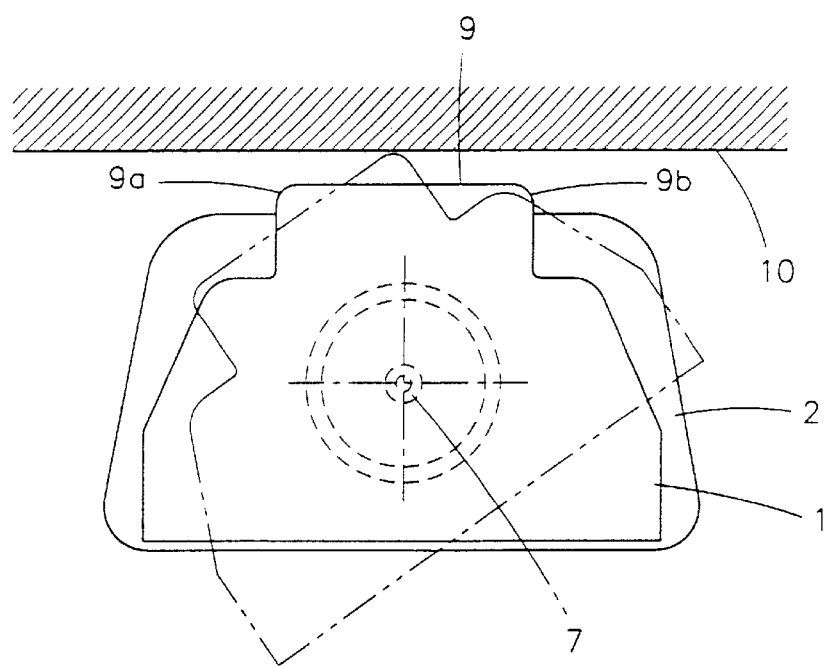
FIG. 4 is a plan view showing a turning state when the conventional Video display stand is placed closely near a wall.
Figure 5:
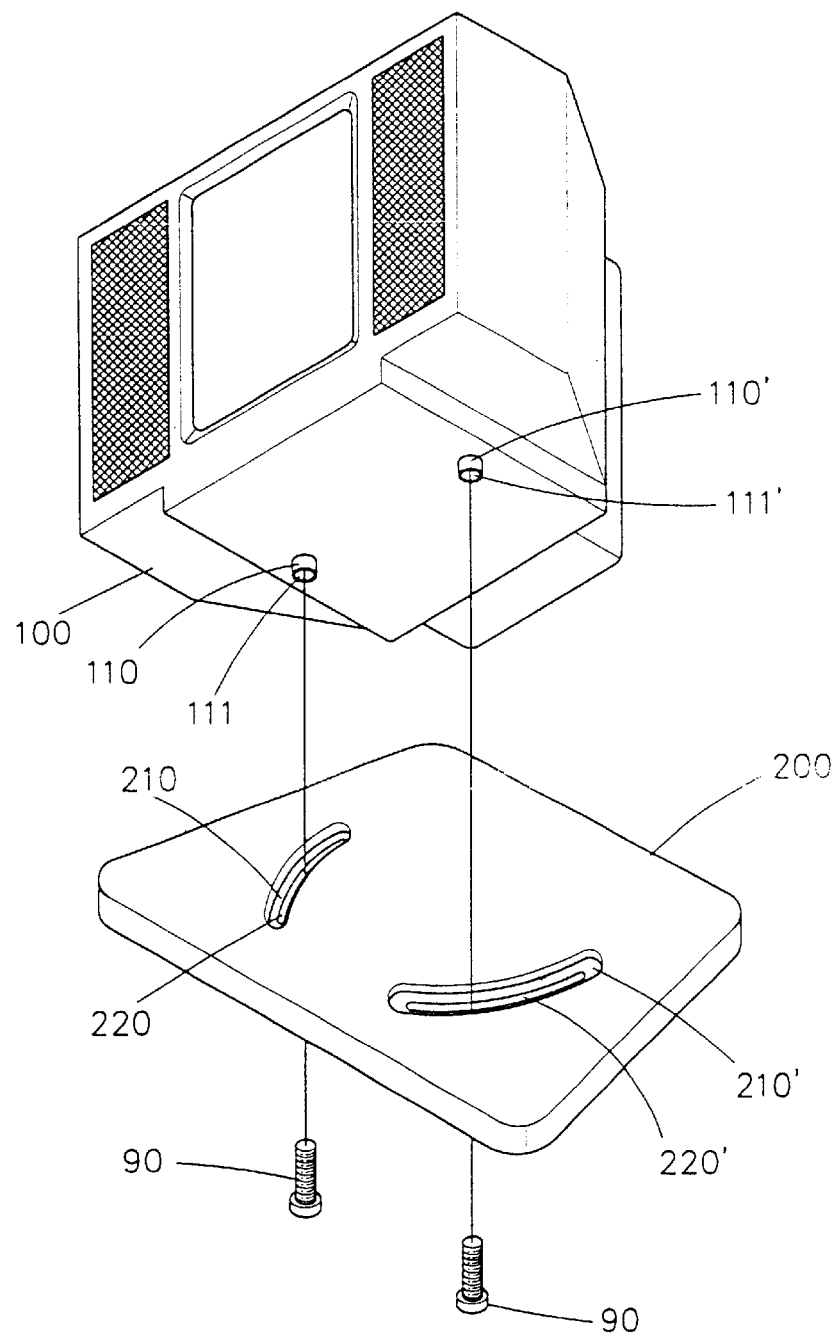
FIG. 5 is a perspective of a Video display stand with a rotation support member as separated having dual panning axes in accordance with one embodiment of the present invention.
Figure 6:
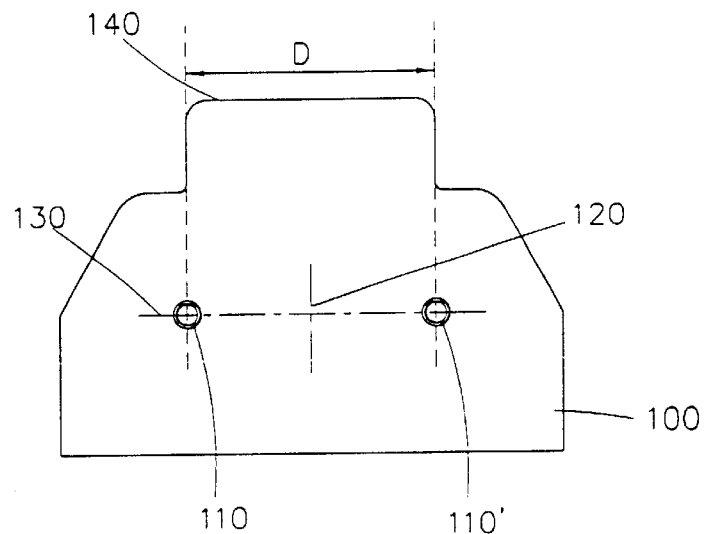
FIG. 6 is a bottom view of the Video display stand main body having dual panning axes in accordance with one embodiment of the present invention.
Figure 7:
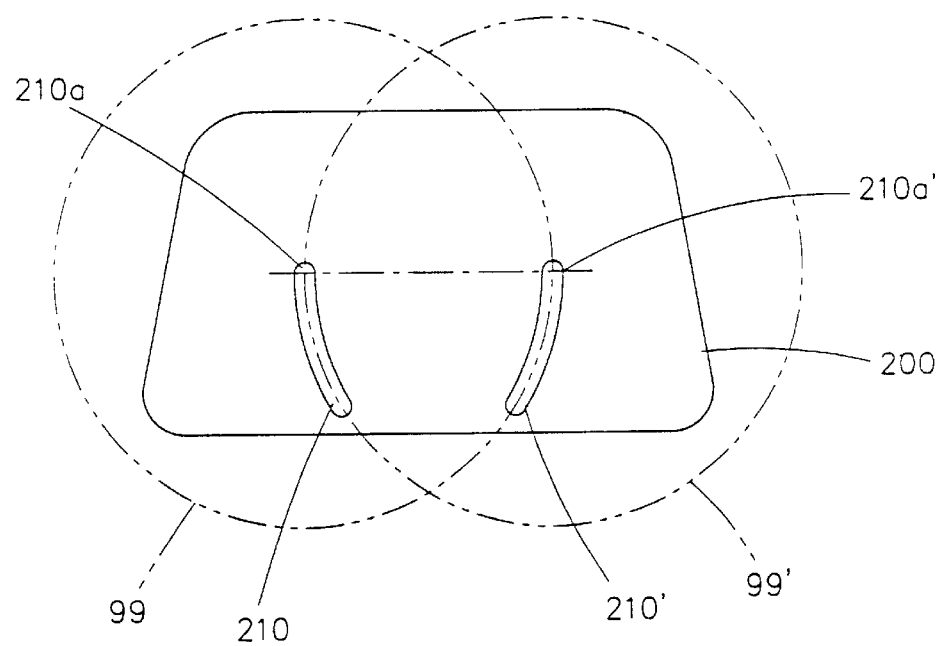
FIG. 7 is a plan view of the rotation support member of the Video display stand having dual panning axes in accordance with one embodiment of the present invention.

FIG. 5 is a perspective of a Video display stand with a rotation support member as separated having dual panning axes in accordance with one embodiment of the present invention; FIG. 6 is a bottom view of the Video display stand main body having dual panning axes in accordance with one embodiment of the present invention; FIG. 7 is a plan view of the rotation support member of the Video display stand having dual panning axes in accordance with one embodiment of the present invention; and FIG. 8 is a sectional view showing a turning support structure of the Video display stand having dual panning axes in accordance with one embodiment of the present invention.

As shown in the drawings, in a video display stand having the dual panning axes in accordance with one embodiment of the present invention, two rotational shafts 110 and 110' each having a thread groove 111 and 111' are protrusively formed at a bottom surface of a TV set main body 100. In this respect, the two rotational shafts 110 and 110' are disposed to be symmetrical right and left on a straight line 130 passing the center of gravity 120 of the TV set main body 100, so that the distance therebetween is the same as the width D of a rear portion 140 of the TV set main body 100 or can be wider.

Figure 8:
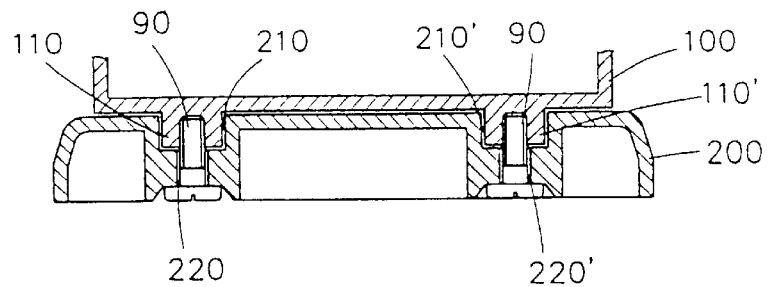
FIG. 8 is a sectional view showing a turning support structure of the Video display stand having dual panning axes in accordance with one embodiment of the present invention.

On a rotation support member 200 supporting the TV set main body 100, two arcuate movement guide toothed slots 210 and 210' are formed to receive the two rotational shafts 110 and 110', in which opening portions 220 and 220' are formed along the circular arc, through which each screw 90 is engaged with the two rotational shafts 110 and 110' as shown in FIG. 8 in a manner that the two rotational shafts 110 and 110' are movable in the movement guide toothed slots 210 and 210'.

As shown in FIG. 7, the movement guide toothed slots 210 and 210' are formed on a predetermined portion along an arc segment of the circular arc in the forward direction taken from each central point of two circles 99 and 99' overlapped with the interval D of the two rotational shafts 110 and 110' as the radius.

The operation of right-turning and left-turning of the Video display stand having dual panning axes in accordance with one embodiment of the present invention constructed as described above will now be explained.

The two rotational shafts 110 and 110' of the TV set main body 100 can be rotated centering the mutually opposite rotational shaft only when they are positioned in rear end portion 210*a* and 210*a'* of the movement guide toothed slots 210 and 210' of the rotation support member 200.

When the two rotational shafts 110 and 110' are positioned at the rear end portions 210*a* and 210*a'* of the movement guide toothed slot 210 and 210', the TV set main body is directed to the front side.

Figure 9A:
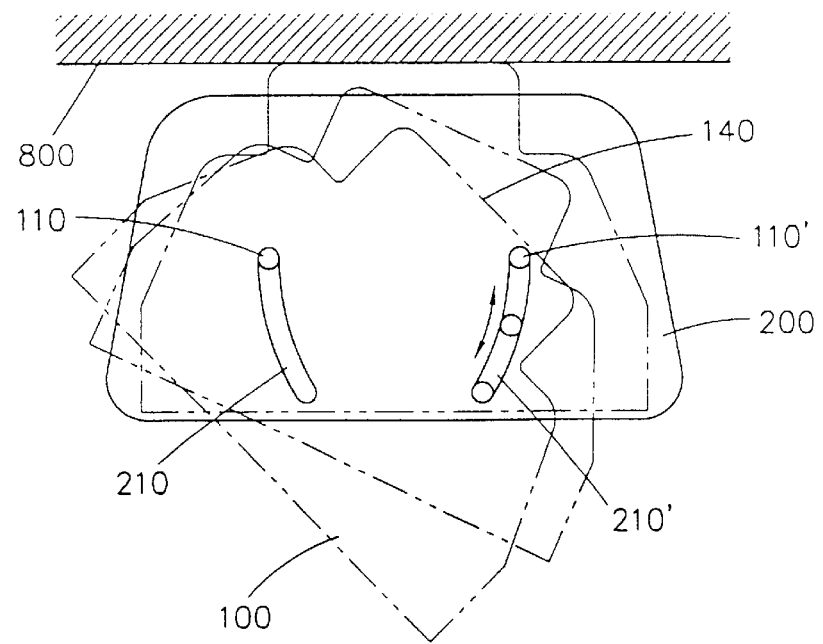
FIG. 9a is a plan view showing a state that the Video display stand having dual panning axes placed near the wall is turned centering a shaft of one side in accordance with one embodiment of the present invention
Figure 9B:
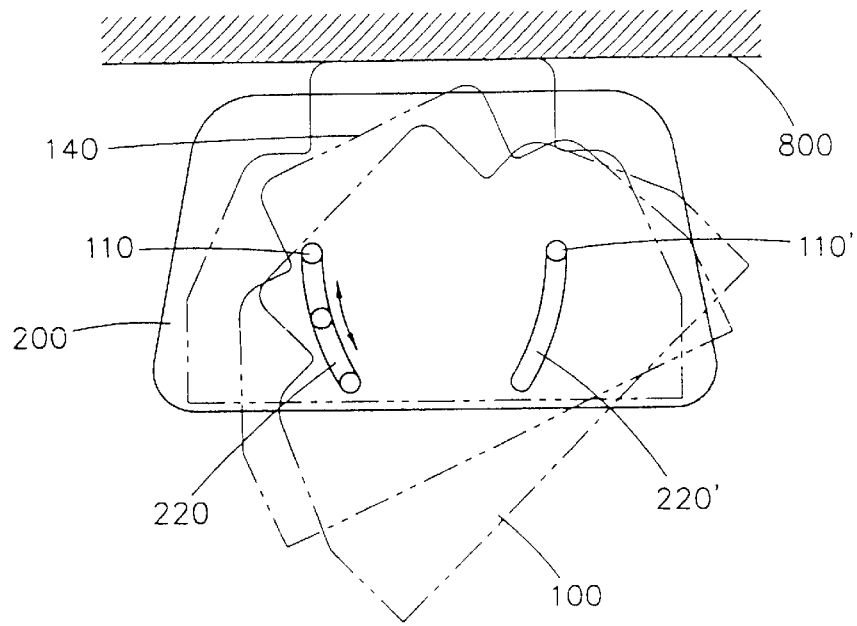
FIG. 9b is a plan view showing a state that the Video display stand having dual panning axes placed near the wall is turned centering a shaft of the other side in accordance with one embodiment of the present invention.

In a state that the TV set main body is directed to the front side, as shown in FIG. 9*a*, when the right side rotational shaft 110' is moved centering the left side rotational shaft 110 along the right side movement guide toothed slot 210', the screen of the TV set is turned leftward, conversely, as shown in FIG. 9*b*, when the left side rotational shaft 110 is moved centering the right side rotational shaft 110' along the left side movement guide toothed slot 210, the screen of the TV set is turned rightward.

In this respect, the maximum turning radius of the right and left edge portions of the rear end portion 140 of the TV set corresponding to the two rotational shafts 110 and 110' is obtained inside the wall 800, and the two rotational shafts 110 and 110' are restrained from moving backward from the rear end portions 210*a* and 210*a'* of the movement guide toothed slots 210 and 210', so that there is no possibility that the rear portion 140 of the TV set main body 110 would bump against the wall 800.

Figure 10:
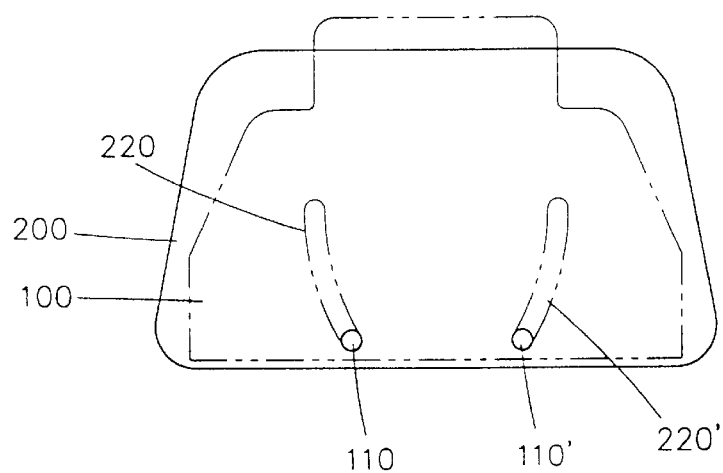
FIG. 10 is a view showing a combined state of the Video display stand having dual panning axes in accordance with a modification of one embodiment of the present invention.

FIG. 10 is a view showing a combined state of Video display stand having dual panning axes in accordance with a modification of one embodiment of the present invention, where the rotational shafts 110 and 110' and the movement guide toothed slots 220 and 220' are formed mutually in the opposite side to that according to one embodiment of the present invention.

In detail, the two rotational shafts 110 and 110' are protrusively formed on the rotation support member 200, while movement guide toothed slots 210 and 210' having the same shape as in one embodiment of the present invention are formed at the bottom surface of the TV set main body 100 so as to receive the two rotational shafts 110 and 110'. The rotational shafts 110 and 110' are positioned at a front end portion of the movement guide toothed slots 210 and 210' of the main body 100 in a state that the TV set main body 100 is directed to the front side.

The operations of the Video display stand having dual panning axes according to the modification of one embodiment of the present invention to turn the TV set rightward or leftward are the same as the operations of the above-described embodiment, thus, descriptions of which are omitted.

Meanwhile, as is known, the TV set is mostly controlled by a remote-controller for viewers' convenience.

Accordingly, the video display stand having dual panning axes for automatically rotating two shafts by using the driving force and its controlling method in accordance with another embodiment will now be described with reference to the accompanying drawings.

Figure 11:
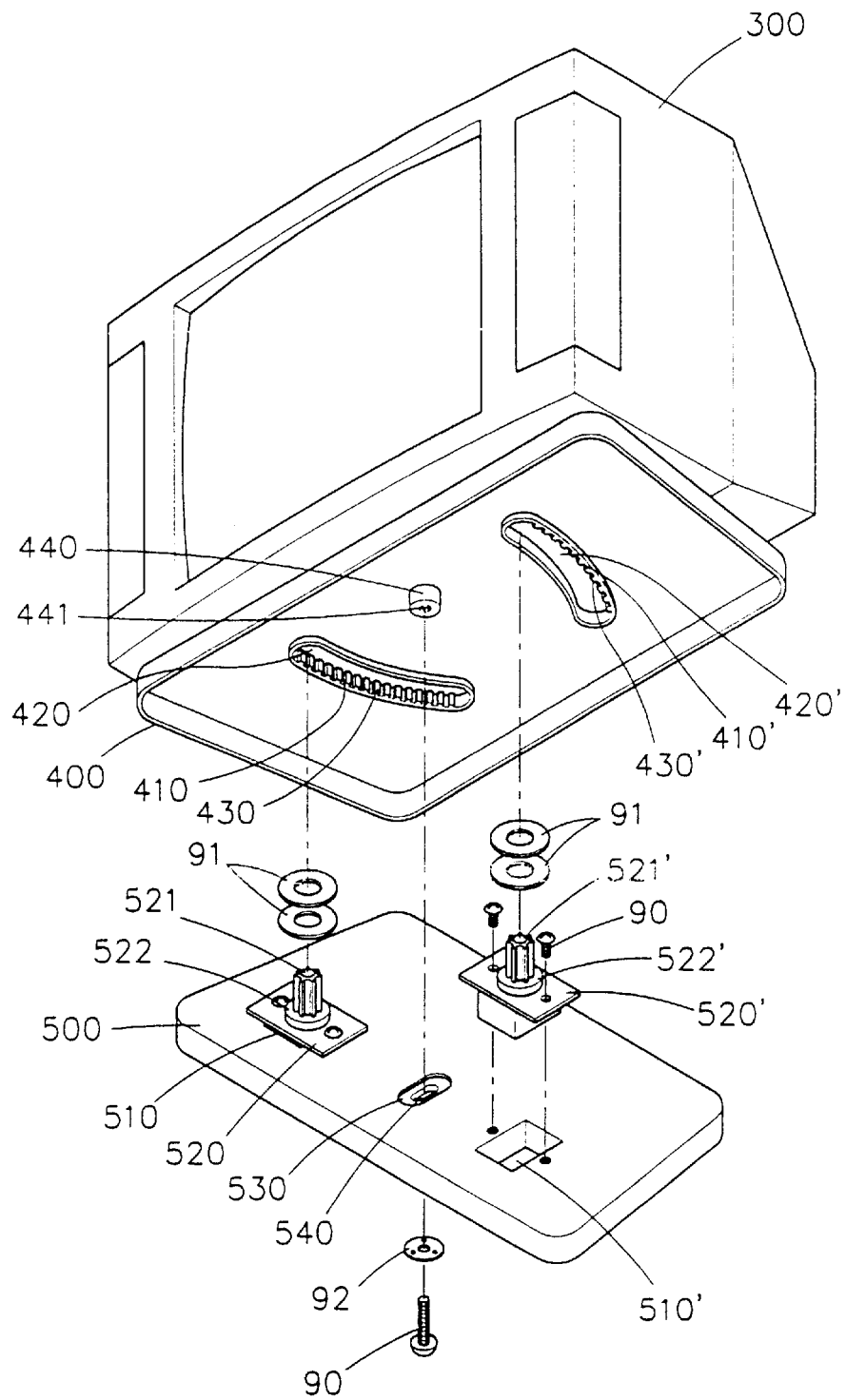
FIG. 11 is a perspective view of the Video display stand and the rotation support member as separated having the dual panning axes by using a driving force in accordance with another embodiment of the present invention.

FIG. 11 is a perspective view of the Video display stand and the rotation support member as separated having the dual panning axes by using the driving force in accordance with another embodiment of the present invention.

Reference 300 denotes a TV set main body, reference 400 denotes a rotational base incorporatively formed or separatively combined with the bottom surface of the TV set main body 300, and reference numeral 500 is a rotation support member for supporting the rotational base 400.

The video display stand having dual panning axes in accordance with another embodiment includes arcuate movement guide toothed slots 420 and 420' being symmetrically formed at a predetermined space with a predetermined width and depth on the rotational base and having gear portions 410 and 410' at one side (outer side) of a wall thereof; protrusions 430 and 430' formed along an opening of the movement guide toothed slots 420 and 420'; and a circular combination protuberance 440 having a thread groove 441 formed between the two movement guide toothed slots 420 and 420' on the rotational base.

The rotation support member 500 corresponding to the rotational base includes motor installing grooves 510 and 510' each formed with a predetermined space on the same line as taken so as for the two motors 520 and 520' to be installed; a combination groove 530 formed at a central portion of the same line taken for the two motor installing grooves 510 and 510' in a lengthy direction to movably receive the combination protuberance 440 of the rotational base 400 with a predetermined margin forward and backward; and a combination hole 540 formed within the combination groove 530 in a lengthy direction.

For the motors 520 and 520', a spline-shaped driving shafts 521 and 521' are provided to be engaged with the gear portions 410 and 410' of the toothed slots 420 and 420' so as to turn the rotational base 400. Flange-shaped supports 522 and 522' are formed around the driving shafts 521 and 521' at its lower end portion, on which washers 91 made of a material having a low friction force are mounted. The reason for this is to reduce a friction resistance in turning or moving by minimizing the contact area between the protrusions 430 and 430' of the movement guide toothed slots and the corresponding rotational base 400.

The rotational base 400 and the rotation support member 500 are combined in a manner that a combination screw 90 is threaded with the combination protuberance 440 of the rotational base through a combination hole 540 at a state that the washer 92 is inserted from the lower portion of the rotation support member 500. In this combination, the combination protuberance 440 of the rotational base 400 is a bit movable forward and backward for the predetermined margin within the combination groove 530.

In this respect, the construction elements formed at the rotational base 400 and the rotation support member 500 may be changed to be formed on the mutually opposite side, for which the combination protuberance 440, the combination groove 530 and the combination hole 540 may not be formed.

The video display stand having dual panning axes and a position detection micro-switches in accordance with another embodiment of the present invention, and a method for judging screen direction thereof will now be described with reference to FIGS. 12, 13*a* and 13*b*.

Figure 12:
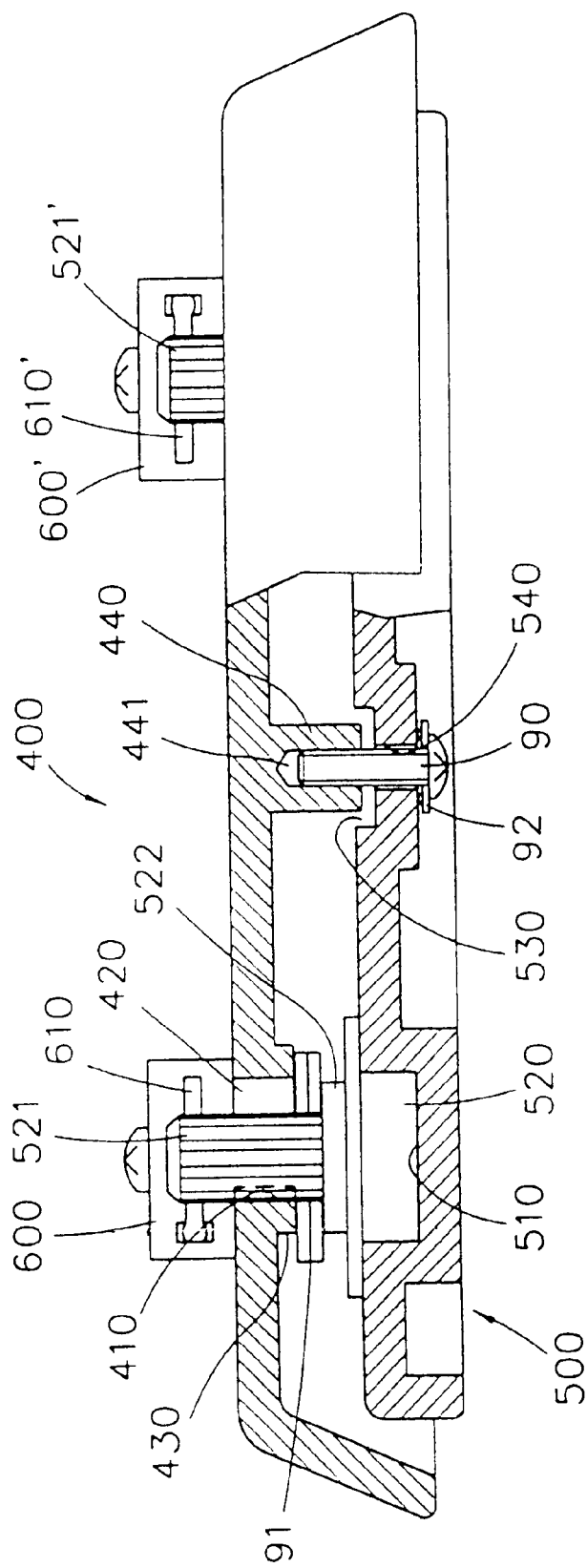
FIG. 12 is a partial sectional view showing a combined state of the Video display stand having dual panning axes in accordance with another embodiment of the present invention.

FIG. 12 is a partial sectional view showing a combined state of the Video display stand having dual panning axes in accordance with another embodiment of the present invention; FIG. 13*a* is a plan view of major portion showing a state that a gear driving shaft at one side is touched by a position detecting micro-switch of the Video display stand having dual panning axes in accordance with another embodiment of the present invention; and FIG. 13b is a plan view of major portion showing a state that the gear driving shaft at one side is separated from the position detection micro-switch of the Video display stand having dual panning axes in accordance with another embodiment of the present invention.

Figure 13A:
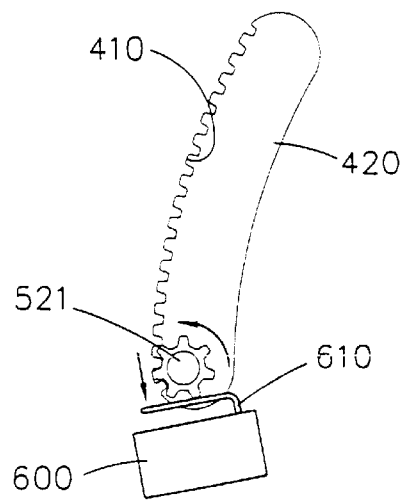
FIG. 13a is a plan view of major portion showing a state that a gear driving shaft at one side is touched by a position detecting micro-switch of the Video display stand having dual panning axes in accordance with another embodiment of the present invention.
Figure 13B:
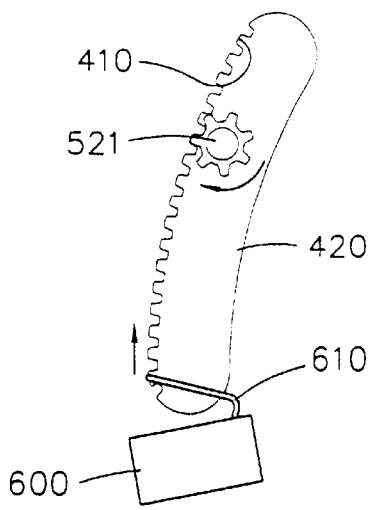
FIG. 13b is a plan view of major portion showing a state that the gear driving shaft at one side is separated from the position detection micro-switch of the Video display stand having dual panning axes in accordance with another embodiment of the present invention.

As shown in FIG. 12, end portions of the gear driving shafts 521 and 521' are protruded from the upper surface of the rotational base 400, and as shown in FIGS. 13a and 13b, a micro-switch 600 and 600' having contact plates 610 and 610' each being touched by the end portion of the gear driving shafts 521 and 521' are installed at an upper surface of the rotational base 400, that is, the front end portion of the movement guide toothed slots 420 and 420', and controlling electric signals to inform of touching state as the contact plate 610 and 610' are touched or separated according to the movement position of the movement guide toothed slots 420 and 420' which are moved as being engaged with the gear driving shafts 521 and 521' of the motors 520 and 520'.

By combining the signals informing whether the micro-switches 600 and 600' installed at the front end portion of the movement guide toothed slots 420 and 420' are touched or not, the screen direction of the TV set main body 300 can be judged as being classified to front, right and left sides.

The screen direction of the TV set main body 300 to the front, right or left side will now be described with reference to FIGS. 14a, 14b and 14c.

Figure 14A:
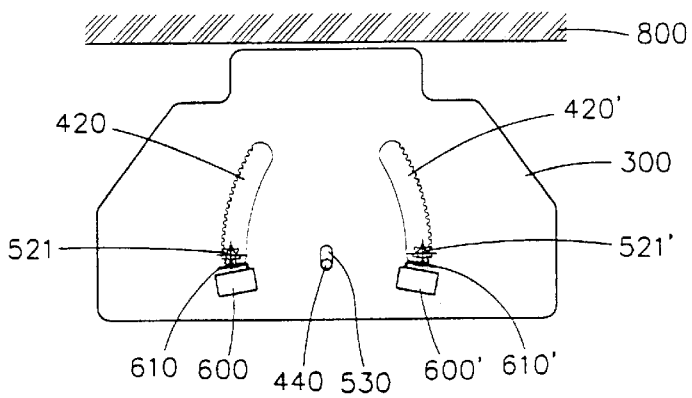
FIG. 14a is a view showing that the Video display stand having dual panning axes is directed to the front side in accordance with another embodiment of the present invention.

FIG. 14a is a view showing that the video display stand having dual panning axes is directed to the front side in accordance with another embodiment of the present invention; FIG. 14b is a view showing a state that the Video display stand having dual panning axes is turned to the left side in accordance with the another embodiment of the present invention; and FIG. 14c is a view showing a state that the Video display stand having dual panning axes is turned to the right side in accordance with the another embodiment of the present invention.

First, as shown in FIG. 14a, in case that the TV set main body 300 is directed to the front side, the two gear driving shafts 521 and 521' are all positioned at the front end portion of the movement guide toothed slots 420 and 420', being touched by the contact plate 610 and 610' of the micro-switches 600 and 600', and the combination protuberance 440 of the rotational base 400 is positioned at the front end portion of the movement guide toothed slots 530.

Figure 14B:
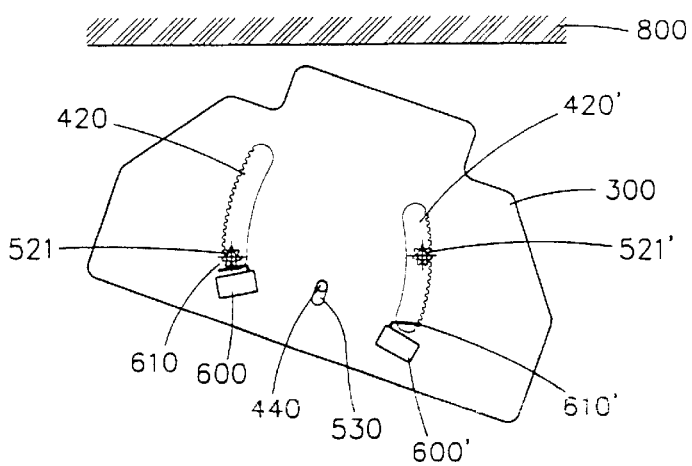
FIG. 14b is a view showing a state that the Video display stand having dual panning axes is turned to the left side in accordance with the another embodiment of the present invention.
Figure 14C:
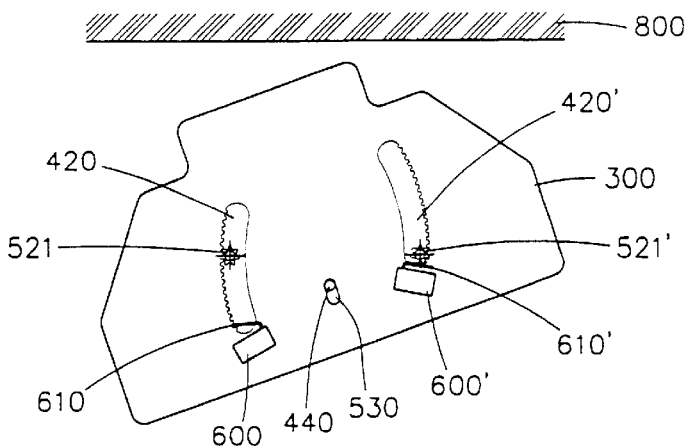
FIG. 14c is a view showing a state that the Video display stand having dual panning axes is turned to the right side in accordance with the another embodiment of the present invention.

Meanwhile, as shown in FIGS. 14b and 14c, in case that the TV set main body 300 is directed to the right side or to the left side, the driving shafts 521 and 521' are touched only by one of either the contact plate 610 or the contact plate 610' of the micro-switches 600 and 600', while the other being separated therefrom regardless of the turning angle, and at this time, the combination protuberance 440 of the rotational base 400 is positioned at the rear end portion of the movement guide toothed slot 530.

Accordingly, on the basis of the signals according to the touching state between the driving shafts 521 and 521' and the micro-switches 600 and 600', the screen direction of the TV set can be judged whether it is directed to the front side, or right or left side.

The operation of driving the motor for the desired direction from the current direction of the TV will now be explained in detail.

First of all, in the following description on the rotation of the driving shafts, the driving of the motor driving shaft clockwise is defined as a normal direction while the driving the motor driving shaft counterclockwise is defined as a reverse direction.

In a state that the screen of the TV set is directed to the front side as shown in FIG. 14a, the screen direction can be turned leftward by driving the right side motor 520 in the normal direction centering the gear driving shaft 521 as shown in FIG. 14b, and conversely, the screen direction can be turned rightward by driving the left side motor 520 in the reverse direction centering the gear driving shaft 521' as shown in FIG. 14c.

Meanwhile, as shown in FIG. 14b, when the TV set is desired to be turned rightward from a state that it is directed to the left side, the right side motor 520' is first driven in the reverse direction centering the left side driving shaft 521, and as the driving shaft 521' is touched by the contact plate 610' of the right side micro-switch 600', its driving is stopped, and the left side motor 520 is driven in the reverse direction centering the right side driving shaft 521', by which the screen direction is turned in the rightward direction.

Reversely, as shown in FIG. 14c, when the screen of the TV set is desired to turn leftward from a state that it is directed to the right side, the left side motor 520 is first driven in the normal direction centering the right side driving shaft 521', and as the driving shaft 521 is touched by the contact plate 610 of the left side micro-switch 600, its driving is stopped, and then the right side motor 520' is driven in the normal direction centering the left side driving shaft 521, by which the screen direction is turned to the leftward direction.

With respect to the FIGS. 14a to 14c, reference numeral 800 denotes a wall inside a room. Even in case that the TV set main body 300 is positioned very near the wall 800, when the TV set main body 300 is turned centering one of either shaft, the maximum turning radius of the right and left edge portions at the rear side of the TV set corresponding to the two rotational shafts 521 and 521' is obtained inside the wall surface and the combination protuberance 440 of the rotational base 400 is moved a bit forward within the movement guide toothed slot 530, so that there is no possibility for the rear portion of the main body 300 to be bumped against the wall 800.

The construction of the control circuit for automatically controlling the screen directions of the TV set by operating the driving motor will now be described with reference to FIG. 15.

Figure 15:
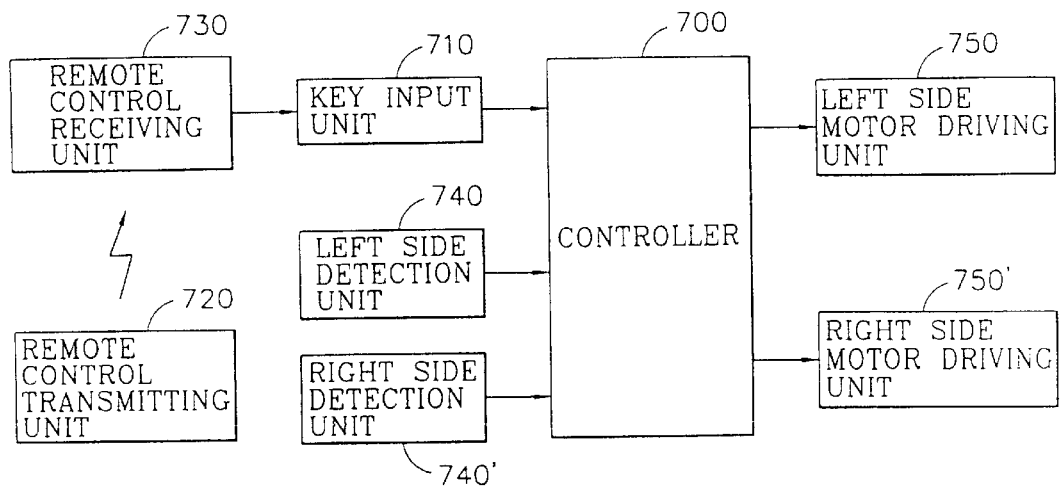
FIG. 15 is a schematic block diagram of a control circuit controlling the screen direction of the Video display stand having dual panning axes in accordance with another embodiment of the present invention.

FIG. 15 is a schematic block diagram of the control circuit for controlling the screen direction of Video display stand having dual panning axes in accordance with another embodiment of the present invention. As shown in the drawing, the control circuit includes a controller 700 controlling each part; a key input unit 710 operated by a user; a remote control transmitting unit 720 and a remote control receiving unit 730 as substitutive wireless input units; a right side and left side detection units 740' and 740 each for detecting turning direction of the TV set by using the micro-switches 600 and 600'; and right side and left side motor driving units 750' and 750 for driving the motors 520 and 520'.

The controller 700 includes a microcomputer.

That is, under the control of the microcomputer performing a predetermined program control function, the operation command inputted through the key input unit 710 by the user is detected by the right side and the left side detection units 740' and 740, and based on the current screen direction as detected, the right side and the left side driving motors 750' and 750 are selectively driven, details of which will be described later.

The key input unit 710 includes a switch button key for turn command newly added in the present invention as well as a button key such as a power switch normally provided at the TV set. The remote control transmitting unit 720 refers to the usual remote-controller including a switch button key for turn command.

The operation of automatically controlling the screen direction of the video display stand having dual panning by using the driving force in accordance with another embodiment of the present invention constructed as described above will now be explained with reference to FIGS. 16 through 19.

Figure 16:
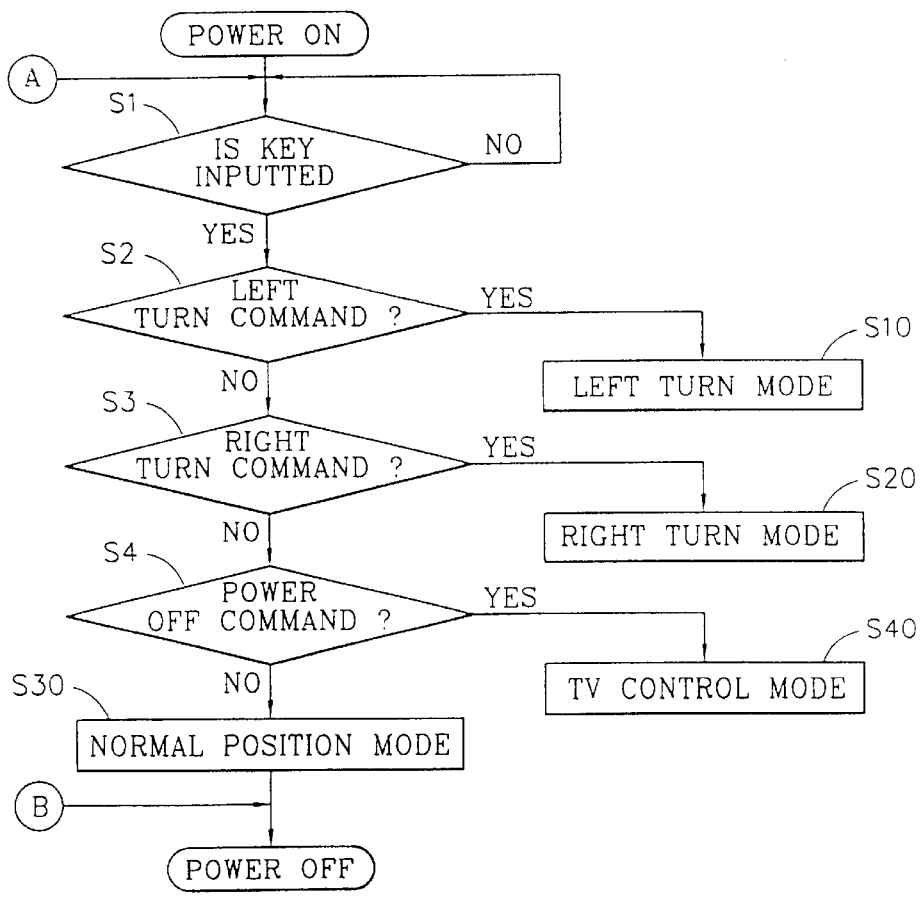
FIG. 16 is a flow chart of operations of the Video display stand having dual panning axes under the control of the control circuit in accordance with another embodiment of the present invention.
Figure 17:
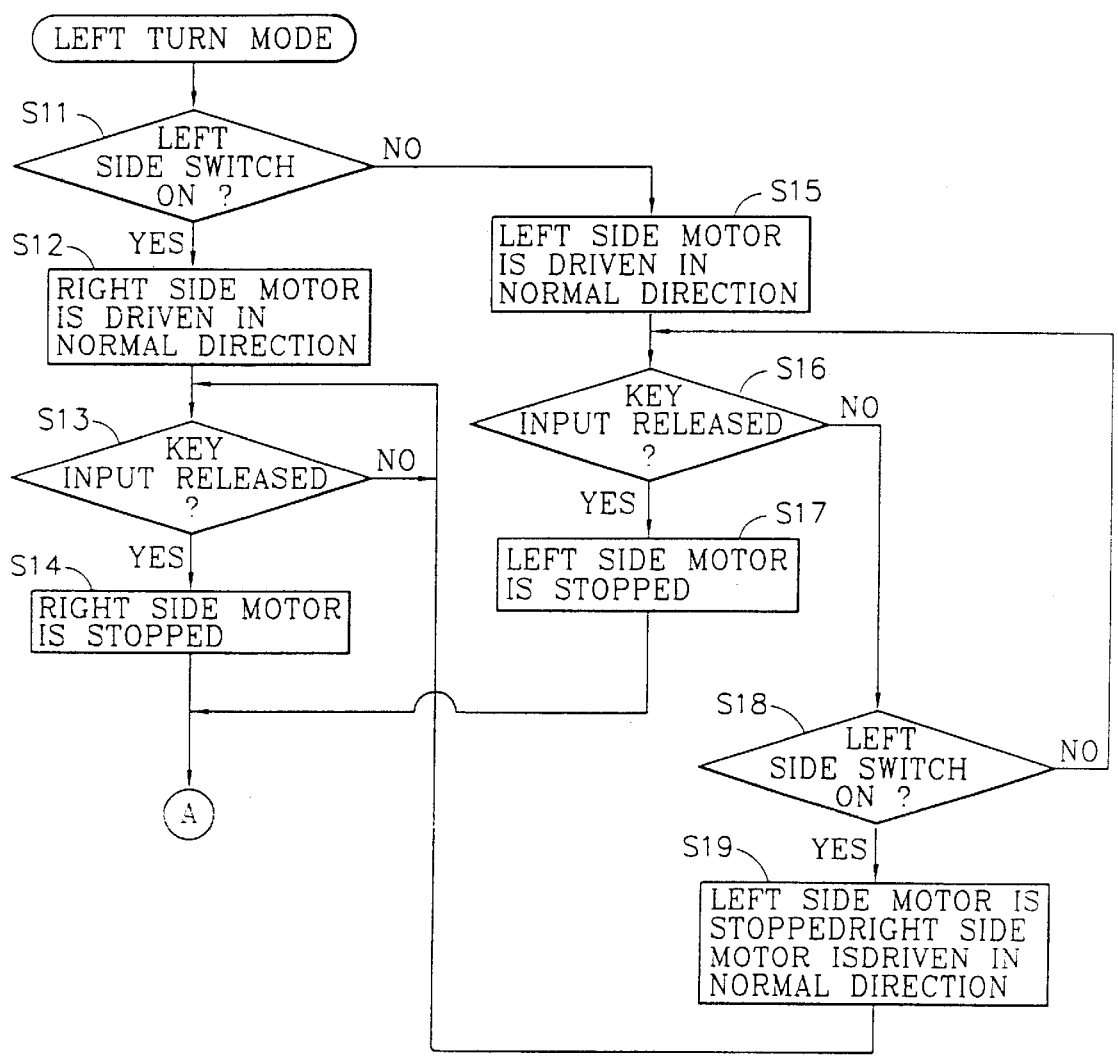
FIG. 17 is a flow chart of a left turn mode in the operations of the Video display stand having dual panning axes in accordance with another embodiment of the present invention.
Figure 18:
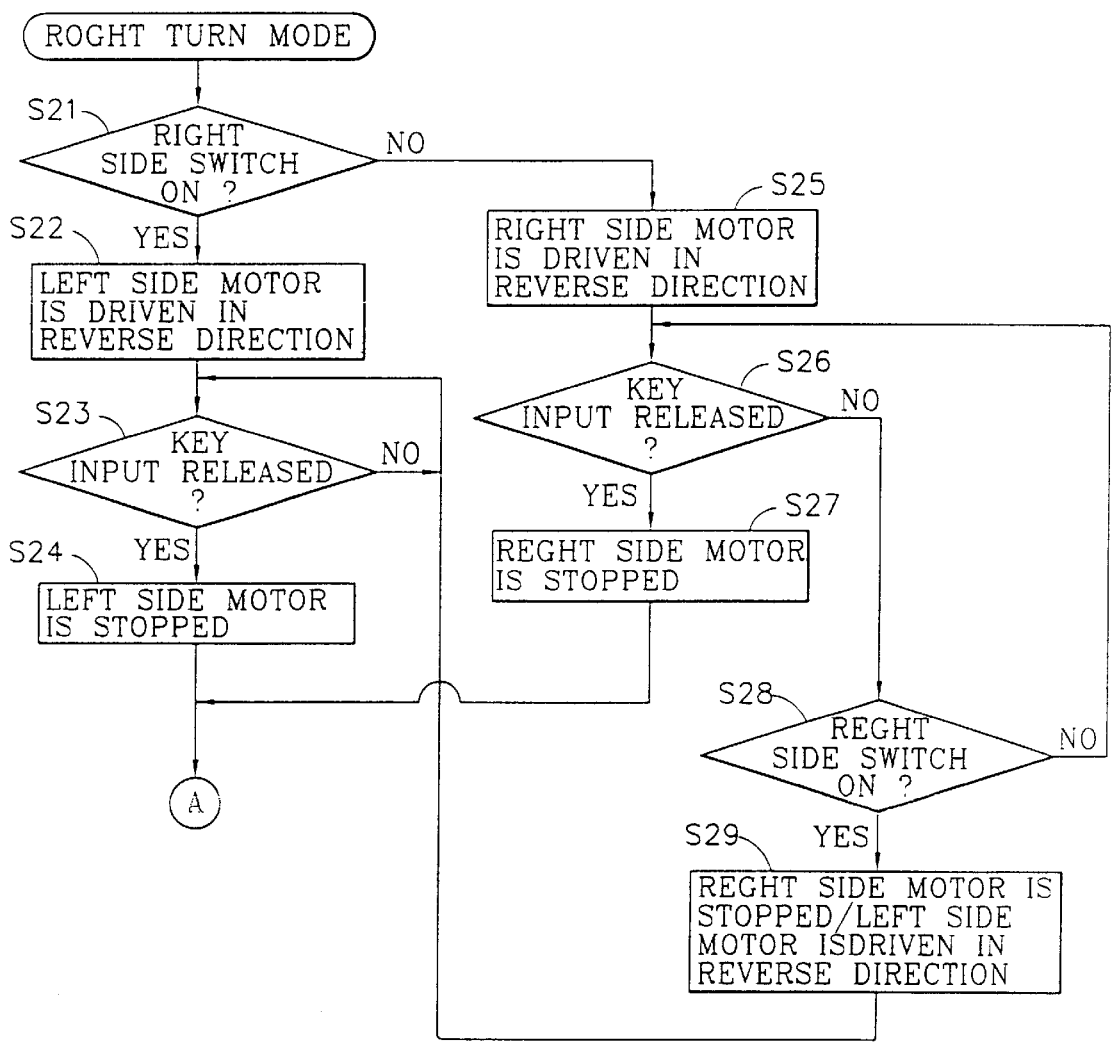
FIG. 18 is a flow chart of a right turn mode in the operations of the Video display stand having dual panning axes under the control of the control circuit in accordance with another embodiment of the present invention.
Figure 19:
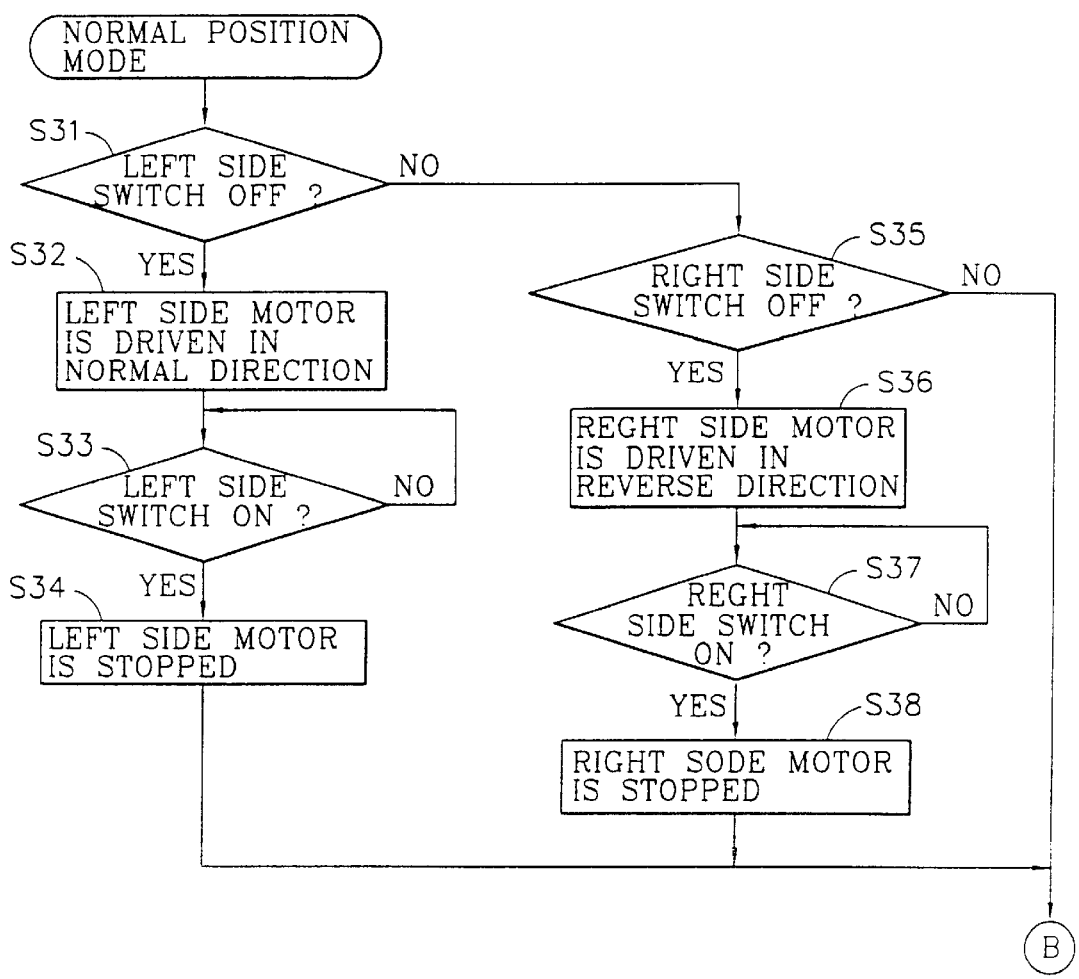
FIG. 19 is a flow chart of a normal position mode in the operations of the Video display stand under the control of the control circuit in accordance with another embodiment of the present invention.

FIG. 16 is a flow chart of operations of the Video display stand having dual panning axes under the control of the control circuit in accordance with another embodiment of the present invention; FIG. 17 is a flow chart of a left turn mode in the operations of the Video display stand having dual panning axes in accordance with another embodiment of the present invention; FIG. 18 is a flow chart of a right turn mode in the operations of the Video display stand having dual panning axes under the control of the control circuit in accordance with another embodiment of the present invention; and FIG. 19 is a flow chart of a normal position mode in the operations of the Video display stand under the control of the control circuit in accordance with another embodiment of the present invention.

First, as shown in FIG. 16, when the TV is switched on, the controller 700 of FIG. 15 judges whether there is a key input by a user directly from the key input unit 710 or from the remote control transmitting unit 720 wirelessly in the step S1.

When there is a key input by the user, the controller 700 sequentially judges whether the input command is a right turn command or left turn command, or power disconnection (power-OFF) command in the steps S2–S4 to perform left turn mode in the step S10 or right turn mode in the step S20 according to the judged command if the command relates to the screen direction turning mode in each step, while performing a normal position mode in the step S30 to switch off the TV set for ending if the command relates to a power disconnection command, or performing a normal TV control mode if the command is neither the turning mode nor the power disconnection command.

Detailed descriptions for each mode are as follows.

In case that the left turn mode in the step S10 is selected according to the user's key input:

As shown in FIG. 17, first, it is judged whether the left side micro-switch 600 is touched ON by means of the left side detection unit 740 in the step S11.

When the left side micro-switch 600 is touched ON, which signifies that the TV set main body 300 is directed to the front side as shown in FIG. 14a, or is directed to the left side as shown in FIG. 14b, thus, the right side motor 520' is driven in the normal direction in the step S12 to turn the TV set main body 300 in the leftward direction.

Subsequently, after the right side motor 520' started to be driven in the normal direction, it is judged whether the key input is released in the step S13, and if the key input is not released, the driving is kept on, while if the key input is released, the driving is stopped in the step S14 and returns to the step S1.

Meanwhile, when the left side micro-switch 600 is not touched ON, which signifies that the TV set is directed to the right side as shown in FIG. 14c. Thus, in this case, the left side motor 520 is driven in the normal direction in the step S15, and it is judged whether the key input is released in the step S16. If the key input is released, the driving of the left side motor 520 in the normal direction is stopped in the step S17. Meanwhile, if the key input is not released, it is judged whether the left side micro-switch 600 is touched ON again in the step S18, and if it is not touched ON, the above steps are repeatedly performed while the left side motor 520 is kept driving in the normal direction, and if the left side micro-switch 600 is touched ON, the driving of left side motor 520 is simultaneously stopped and the right side motor 520' is driven in the normal direction so as to go to the step S13.

In case that the right turn mode in the step S20 is selected according to the user's key input:

As shown in FIG. 18, first, it is judged whether the right side micro-switch 600' is touched ON by means of the right side detection unit 740' in the step S21.

When the right side micro switch 600 is touched ON, which signifies either that the TV set main body 300 is directed to the front side as shown in FIG. 14a, or that the TV set main body 300 is directed to the right side as shown in FIG. 14c. Thus, the left side motor 520 is driven in the reverse direction in the step S22 to turn TV set main body 300 in the rightward direction.

After the left side motor 520 is driven to be rotated in the reverse direction, it is judged whether the key input by the user is released in the step S23, and if the key input is not released, the driving is kept on, while, if the key input is released, the driving is stopped in the step S24 to return to the step S1.

Meanwhile, when the right side micro-switch 600' is not touched ON, which signifies that the TV set is directed to the left side as shown in FIG. 14b. Thus, in this case, the right side motor 520' is driven in the reverse direction in the step S25, and it is judged whether the key input is released in the step S26. If the key input is released, the driving of the right side motor 520' in the reverse direction is stopped in the step S27. Meanwhile, if the key input is not released, it is judged whether the right side micro-switch 600' is touched ON again in the step S28, and if it is not touched ON, the above steps are repeatedly performed while the right side motor 520' is kept driving in the reverse direction, and if the right side micro-switch 600' is touched ON, the driving of right side motor 520' is simultaneously stopped and the left side motor 520 is driven in the reverse direction so as to go to the step S23.

In case that the normal position mode S30 is selected according to the key input by the user:

As shown in FIG. 19, first, it is judged whether the left side micro-switch 600 is touched OFF in the step S31.

As shown in FIG. 14c, if the left side micro-switch 600 is touched OFF, the left side motor 520 is driven in the normal direction in the step S23 to judge whether the left side micro-switch 600 is touched ON in the step S33, and if it is touched ON, the driving of left side motor 520 is stopped.

Meanwhile, if the left side micro-switch 600 is not touched OFF, it is judged whether the right side micro-switch 600' is touched OFF in the step S35. As shown in FIG. 14b, if the right side micro-switch 600' is touched OFF, the right side motor 520' is driven in the reverse direction in the step S36 to judge whether the right side micro-switch 600' is touched ON, and if it is touched ON, the driving of the right side motor 520' is stopped in the step S38.

Of course, in case that both the right side and left side micro-switches 600' and 600 are not touched OFF, as shown in FIG. 14a, which signifies that the screen direction of the TV set is directed to the front side, thus, the normal position mode is ended.

The normal position mode S30 is always performed even in the power disconnection(power-OFF) command, for which an additional key may be provided to the key input unit 710 or at the remote control transmitting unit 730, so that the normal position mode can be performed by the key operation conveniently.

In addition, in the video display stand having dual panning axes according to another embodiment of the present invention, since a free-wheel of the motor is possible, the motor can be manually controlled directly.

As so far described, the video display stand having dual panning axes of the present invention is suitably applied to appliances such as a TV set or a personal computer, of which directions are desired to be changed at its own position, by which they can be turned without bumping against the wall even in case that they are placed very near the wall, having an effect of increasing the space utilization.

In addition, with the video display stand having dual panning axes of the present invention, the screen direction can be both automatically and manually controlled by using the driving force, having an effect of increasing the users' convenience.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method for controlling screen direction of the video display stand having dual panning axes for which two motors are selectively driven in a normal direction (clockwise) and in a reverse direction according to a key operation by a user so that a TV set can be turned in the rightward direction or in the leftward direction centering driving shafts of each motor, comprising the steps of:

judging whether the key input by the user is a left turn command or right turn command, and the current screen direction of the TV set;

driving a motor positioned at the opposite side to the key input command, of the two motors, in the normal direction or in the reverse rotation direction until the key input is released, in case that the current TV set is directed to the front side or is placed in the same direction as the judged turn command; and rotating a motor positioned at the side corresponding to the key input command, of the two motors, in the normal direction or in the reverse direction until the key input is released, in case that the TV set is placed in a different direction to the judged turn command.

2. The method according to claim 1, further includes a step for stopping the rotation of the motor positioned at the side corresponding to the key input and then rotating the other motor in the same rotation direction as that of the corresponding motor until the key input is released, in case that the key input has not released yet even when the current TV set is already directed to the front side.

3. The method according to claim 1, wherein in the step of judging whether the key input is right turn command or left turn command, and the screen direction of the TV set, in case that the key input is a left turn command, when the TV set is directed to the same side as the judged command or to the front side, the right side motor is driven in the normal direction until the left turn command is released, while when the TV set is directed to the different side to the judged turn command, the left side motor is driven in the normal direction until the left turn command is released;

in case that the key input is a right turn command, when the TV set is directed to the same side as the judged command or to the front side, the left side motor is driven in the reverse direction until the right turn command is released, while when the TV set is directed to the different side to the judged turn command, the right side motor is driven in the reverse direction until the right turn command is released.

4. The method according to claim 3, wherein when the TV set is directed to the different side to the judged turn command, in case that the left turn command or right turn command is being kept even when the TV set is already turned to be directed to the front side after either the left side motor was driven in the normal direction or the right side motor was driven in the reverse direction, the driving of the motor corresponding to the command is stopped and then the other motor is driven in the same direction as that of the corresponding motor until the turning command is released.

5. The method according to claim 1, further includes a step for judging whether the key input is a power disconnection command besides the turn commands, according to which when it is the power disconnection command and the TV set is directed to the left side or to the right side, a normal position mode is performed to enable the two motors to be selectively driven so as to turn the TV set to be directed to the front side, and then the power is turned off.

6. The method according to claim 5, wherein the normal position mode is performed in that when the TV set is directed to the left side, the right side motor is driven in the reverse direction, while the TV set is directed to the right side, the left side motor is driven in the normal direction.

7. The method according to claim 1, wherein two switches are provided in the step for judging the current screen direction of the TV set by combining touch signals of the two switches in a manner that the switches are touched with both the two motors when the TV set is directed to the front side, while being touched by only one motor of them when the TV set is directed to the right or left side.

8. The method according to claim 7, wherein the switches are touched only by the left side motor when the TV set is directed to the left side, while they are touched only to the right side motor when the TV set is directed to the right side.

* * * * *